United States Patent
Kondo et al.

(10) Patent No.: US 8,997,468 B2
(45) Date of Patent: Apr. 7, 2015

(54) WORK VEHICLE

(71) Applicant: Komatsu Ltd., Tokyo (JP)

(72) Inventors: Yosuke Kondo, Komatsu (JP); Yuki Arai, Komatsu (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 14/124,926

(22) PCT Filed: Dec. 26, 2012

(86) PCT No.: PCT/JP2012/083621
§ 371 (c)(1),
(2) Date: Dec. 9, 2013

(87) PCT Pub. No.: WO2014/097492
PCT Pub. Date: Jun. 26, 2014

(65) Prior Publication Data
US 2015/0000258 A1 Jan. 1, 2015

(30) Foreign Application Priority Data

Dec. 20, 2012 (JP) ................................. 2012-278012

(51) Int. Cl.
*F01N 3/00* (2006.01)
*F01N 3/20* (2006.01)
*F01N 13/00* (2010.01)

(52) U.S. Cl.
CPC ............ *F01N 3/2066* (2013.01); *F01N 13/002* (2013.01)

(58) Field of Classification Search
CPC ... F01N 3/2066; F01N 3/208; F01N 2610/02; F01N 2610/14
USPC ........... 60/272, 295, 297, 298, 301, 303, 317, 60/320, 324
See application file for complete search history.

(56) References Cited

U.S. PATENT DOCUMENTS 6,401,961 B1 6/2002 Butler
8,256,551 B2 * 9/2012 Entriken et al. ............. 180/68.1
(Continued)

FOREIGN PATENT DOCUMENTS

DE 39 38 959 A1 5/1991
EP 1 058 626 B1 12/2001
(Continued)

OTHER PUBLICATIONS

International Search Report for PCT/JP2012/083621 issued on Apr. 16, 2013.
The German Office Action for the corresponding German application No. 11 2012 002 167.3, issued on Jul. 15, 2014.

*Primary Examiner* — Jason Shanske
*Assistant Examiner* — Mickey France
(74) *Attorney, Agent, or Firm* — Global IP Counselors, LLP

(57) ABSTRACT

A radiator is arranged behind an engine, a selective catalytic reduction apparatus, and a connecting pipe. A partition wall partitions first and second accommodation spaces. The engine, the selective catalytic reduction apparatus, and the connecting pipe are arranged in the first space. The radiator is arranged in the second space. A reducing agent tank is arranged behind the partition wall. A reducing ejection apparatus attached to the pipe ejects reducing agent into the pipe. A reducing agent hose connects the tank and the apparatus. The hose has a boundary portion positioned at a boundary between the first and second spaces. A height position of the boundary portion is between top and bottom sections of the connecting pipe. The boundary portion and the reducing agent ejection apparatus are arranged on a left or right side of a center line extending in a front and back direction of the partition wall.

10 Claims, 6 Drawing Sheets

(56) References Cited

U.S. PATENT DOCUMENTS

| | | | |
|---|---|---|---|
| 8,635,860 B1* | 1/2014 | Robinson | 60/298 |
| 2010/0018732 A1 | 1/2010 | Daniel et al. | |
| 2010/0266458 A1* | 10/2010 | Takeshita et al. | 422/109 |
| 2011/0005853 A1* | 1/2011 | Kamiya | 180/296 |
| 2011/0011665 A1* | 1/2011 | Peterson et al. | 180/309 |
| 2012/0217082 A1* | 8/2012 | Kleinhenz et al. | 180/309 |
| 2012/0247861 A1 | 10/2012 | Mizuno et al. | |
| 2013/0291523 A1* | 11/2013 | Shah et al. | 60/287 |

FOREIGN PATENT DOCUMENTS

| | | | |
|---|---|---|---|
| JP | 2003123779 A | * | 4/2003 |
| JP | 2008240677 A | * | 10/2008 |
| JP | 2009-184558 A | | 8/2009 |
| JP | 2011-529538 A | | 12/2011 |
| WO | 2011/152306 A1 | | 12/2011 |

* cited by examiner

WORK VEHICLE

CROSS-REFERENCE TO RELATED APPLICATIONS

This application claims priority to Japanese Patent Application No. 2012-278012 filed on Dec. 20, 2012, the entire contents of which are hereby incorporated by reference. Also, this application is a U.S. National stage application of International Application no. PCT/JP2012/083621, filed on Dec. 26, 2012.

BACKGROUND

1. Field of Invention

The present invention relates to a work vehicle.

2. Background Information

In recent years, the mounting of an exhaust processing apparatus for processing exhaust onto a work vehicle has become desirable. The exhaust processing apparatus is connected to an engine through a connecting pipe in order to process the exhaust from the engine. A selective catalytic reduction apparatus may be used as the exhaust processing apparatus. The selective catalytic reduction apparatus reduces the nitrogen oxide (NOx) in the exhaust.

The selective catalytic reduction apparatus processes the exhaust using a reducing agent such as aqueous urea. As a result, it is necessary to arrange a reducing agent tank which retains the reducing agent in the work vehicle. However, there is a possibility that the reducing agent may freeze in a low temperature environment. Accordingly, it is desirable for the reducing agent tank to be arranged to be kept at a temperature where freezing does not occur. For example, in the hydraulic excavator according to Japan Patent Laid-open Patent Publication No. 2009-184558, a reducing agent tank is arranged inside a counterweight which is arranged in the rear section of the vehicle.

SUMMARY

A space within the counterweight described above is connected to the space where the engine is accommodated. As a result, if the reducing agent tank is arranged in the counterweight, it is possible to suppress freezing using the heat from the engine. However, there is a possibility that the temperature of the reducing agent will be excessively increased and change into a different substance with the passing of time.

Furthermore, the reducing agent tank is connected to the selective catalytic reduction apparatus through a reducing agent hose. In a case where the reducing agent tank is arranged to be separated from the selective catalytic reduction apparatus, the reducing agent hose becomes long. In this case, since the reducing agent in the reducing agent hose is easily influenced by the surrounding temperature, it is desirable to suppress an excessive increase in the temperature for the reducing agent in the reducing agent hose as well as the reducing agent in the reducing agent tank.

An object of the present invention is to provide a work vehicle where it is possible to suppress an excessive increase in the temperature of the reducing agent.

A work vehicle according to a first aspect is provided with an engine, a selective catalytic reduction apparatus, a connecting pipe, a radiator, a partition wall, a reducing agent tank, a reducing agent ejection apparatus, and a reducing agent hose. The selective catalytic reduction apparatus processes exhaust from the engine. The connecting pipe is connected to the selective catalytic reduction apparatus. The radiator is arranged behind the engine, the selective catalytic reduction apparatus, and the connecting pipe. The partition wall partitions a first accommodation space and a second accommodation space. The engine, the selective catalytic reduction apparatus, and the connecting pipe are arranged in the first accommodation space. The radiator is arranged in the second accommodation space. The reducing agent tank retains the reducing agent and is arranged behind the partition wall. The reducing agent ejection apparatus is attached to the connecting pipe and ejects the reducing agent into the connecting pipe. The reducing agent hose connects the reducing agent tank and the reducing agent ejection apparatus. The reducing agent hose has a boundary portion which is positioned at a boundary between the first accommodation space and the second accommodation space. The position of the height of the boundary portion is positioned between a top section and a bottom section of the connecting pipe in the up and down direction. The boundary portion and the reducing agent ejection apparatus are arranged on the same left or right side with regard to a center line which extends in the front and back direction of the partition wall.

A work vehicle according to a second aspect is the work vehicle according to the first aspect where the partition wall has a through hole. The reducing agent hose is arranged to pass through the through hole. The boundary portion is a portion of the reducing agent hose which passes through the through hole.

A work vehicle according to a third aspect is the work vehicle according to the first or second aspect where the reducing agent hose includes a first hose portion. The first hose portion is arranged so as to extend in the up and down direction along the partition wall in the second accommodation space.

A work vehicle according to a fourth aspect is the work vehicle according to the third aspect where a reducing agent pump is further provided. The reducing agent pump is connected to the reducing agent hose. The reducing agent pump is attached to the partition wall in the second accommodation space.

A work vehicle according to a fifth aspect is the work vehicle according to the third aspect where a cover member is further provided. The cover member covers the first hose portion.

A work vehicle according to a sixth aspect is the work vehicle according to the fourth aspect where a cover member is further provided. The cover member covers the reducing agent pump.

A work vehicle according to a seventh aspect is the work vehicle according to the fifth or sixth aspect where the cover member is attached to the partition wall.

A work vehicle according to an eighth aspect is the work vehicle according to any one of the third to seventh aspects where the reducing agent hose further includes a second hose portion. The second hose portion is arranged to pass below the radiator.

A work vehicle according to a ninth aspect is the work vehicle according to the fifth aspect where a vehicle body cover is further provided. The vehicle body cover is arranged above the second accommodation space. An opening which links to the second accommodation space is provided in the vehicle body cover. A front edge section of the opening is positioned forwards the partition wall. The vehicle body cover includes an inclined surface section. The inclined surface section is provided to span across the front edge section of the opening and the upper end portion of the partition wall and is inclined obliquely forward and upward. The inclined surface section is arranged above the connecting pipe.

A work vehicle according to a tenth aspect is the work vehicle according to the ninth aspect where the cover member is positioned at a lower side of a virtual extended line of the inclined surface section.

In the work vehicle according to the first aspect, the reducing agent tank is arranged behind the partition wall. Accordingly, the reducing agent tank is arranged to be separated from the engine and the selective catalytic reduction apparatus. Due to this, it is possible to suppress an excessive increase in the temperature of the reducing agent in the reducing agent tank.

In addition, the boundary portion of the reducing agent hose is positioned between a top section and a bottom section of the connecting pipe in the up and down direction. Furthermore, the boundary portion and the reducing agent ejection apparatus are arranged on the same left or right side with regard to a center line which extends in the front and back direction of the partition wall. That is, the boundary portion is arranged close to the reducing agent ejection apparatus. Accordingly, it is possible to shorten the length of the portion of the reducing agent hose from the boundary portion to the reducing agent ejection apparatus, that is, of the portion which is arranged in a first accommodation space with the engine. Due to this, it is possible to suppress an excessive increase in the temperature of the reducing agent in the reducing agent hose.

In the work vehicle according to the second aspect, the reducing agent hose is arranged so as to pass through the through hole of the partition wall. As a result, it is possible to shorten the length of the reducing agent hose compared to a case where the reducing agent hose bypasses to the side or the like of the partition wall.

In the work vehicle according to the third aspect, the first hose portion is arranged so as to extend in the up and down direction along the partition wall in the second accommodation space. As a result, it is possible to shorten the length of the first hose portion.

In the work vehicle according to the fourth aspect, the reducing agent pump is attached to the partition wall in the second accommodation space. As a result, it is possible to suppress an excessive increase in the temperature of the reducing agent in the reducing agent pump.

In the working vehicle according to the fifth aspect, the cover member covers the first hose portion. Since the second accommodation space is a space where the radiator is accommodated, cooling air from the radiator flows through the second accommodation space. It is possible for the cover member to protect the first hose portion from the cooling air. Due to this, it is possible to suppress an excessive decrease in the temperature of the reducing agent in the first hose portion.

In the work vehicle according to the sixth aspect, the cover member covers the reducing agent pump. Accordingly, it is possible for the cover member to protect the reducing agent pump from the cooling air from the radiator. Due to this, it is possible to suppress an excessive decrease in the temperature of the reducing agent in the reducing agent pump.

In the working vehicle according to the seventh aspect, the cover member is attached to the partition wall. As a result, the attachment of the cover member is easy.

In the working vehicle according to the eighth aspect, the second hose portion is arranged so as to pass below the radiator. As a result, the reducing agent in the second hose portion is not easily influenced by the cooling air from the radiator.

In the working vehicle according to the ninth aspect, it is possible to enlarge the area of the opening by using the inclined surface section. Due to this, it is possible to increase the volume of the air which passes through the opening. In addition, the inclined surface section is arranged above the connecting pipe. As a result, it is possible to arrange the connecting pipe using the space below the inclined surface section.

In the working vehicle according to the tenth aspect, the cover member is positioned at a lower side of a virtual extended line of the inclined surface section. As a result, it is possible to protect the reducing agent hose inside the cover member from the air flow which flows along the inclined surface section.

DETAILED DESCRIPTION OF THE EMBODIMENTS

Figure 1:
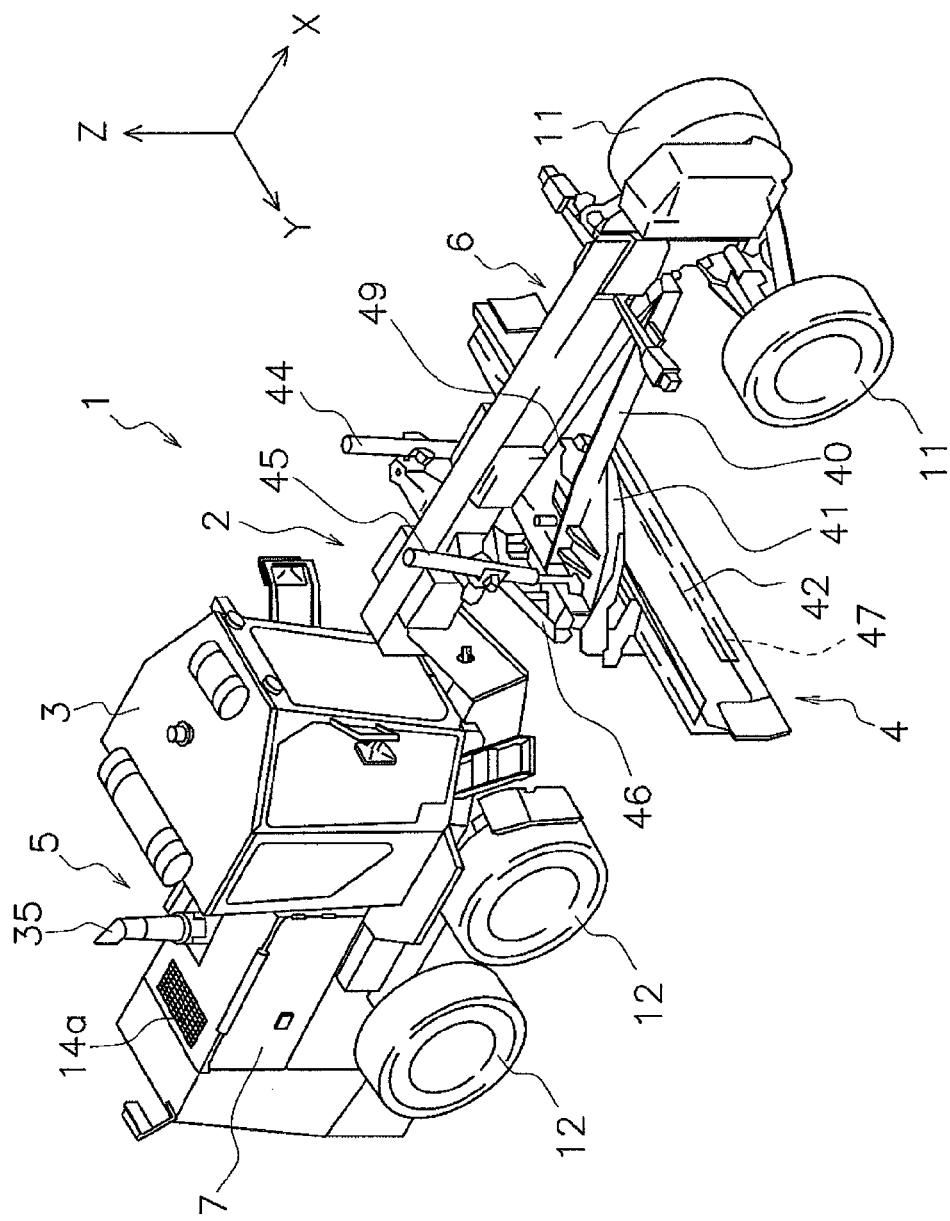
FIG. 1 is a perspective view of the external appearance of a work vehicle.
Figure 2:
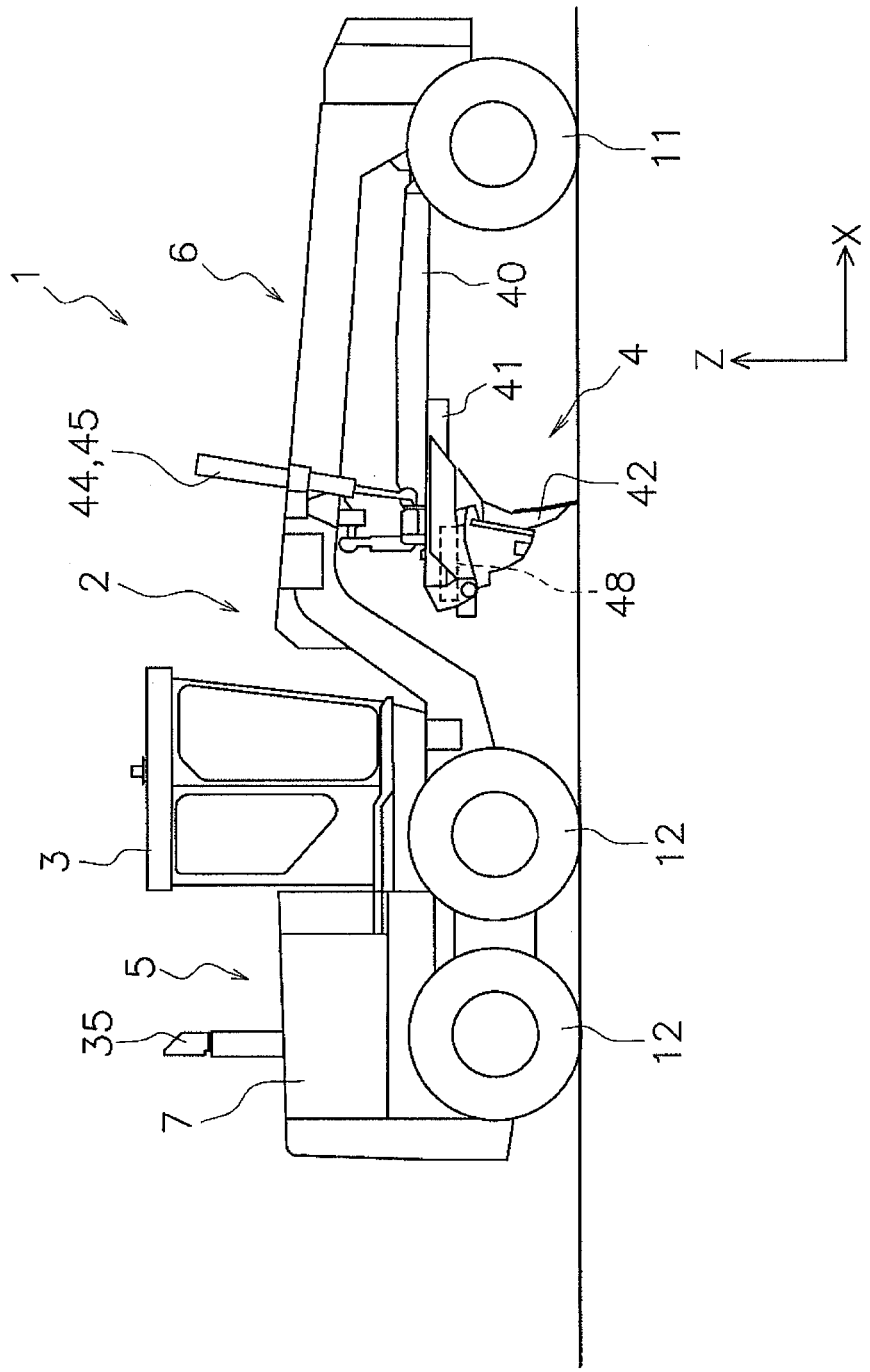
FIG. 2 is a side surface view of the work vehicle.

Below, a work vehicle 1 according to the embodiments will be described with reference to the drawings. FIG. 1 is a perspective view of the external appearance of the work vehicle 1. FIG. 2 is a side surface view of the work vehicle 1. The work vehicle 1 is a so-called motor grader. The work vehicle 1 is provided with a plurality of driving wheels which include front wheels 11 and rear wheels 12. It is possible for the work vehicle 1 to perform ground leveling work, snow removal work, light cutting, material mixing, and the like using a blade 42 which is provided between the front wheels 11 and the rear wheels 12. As shown in FIG. 1 and FIG. 2, the work vehicle 1 is provided with a vehicle body 2, a cab 3, and a work implement 4.

The vehicle body 2 includes a rear section vehicle body 5 and a front section vehicle body 6. The rear section vehicle body 5 has the rear wheels 12 described above. The work vehicle 1 moves due to the rotational driving of the rear wheels 12 according to the driving force from the engine which will be described later. In addition, the rear section vehicle body 5 has an engine compartment 7 which accommodates the engine. The configuration of an inner section of the engine compartment 7 will be described later.

The front section vehicle body 6 is arranged in front of the rear section vehicle body 5. The front section vehicle body 6 has the front wheels 11 described above. The front wheels 11 are arranged in the front section of the front section vehicle body 6.

The cab 3 is mounted to the rear section vehicle body 5. A handle, a gear change lever, and an operating section (which is not shown in the diagram) such as an operating lever of the work implement 4 are provided in an inner section of the cab 3. Here, in the present embodiment, front, back, left, and right have the meaning of front, back, left, and right as viewed by the driver inside the cab 3. In addition, in the diagrams, the front and back direction is shown as the X axis, the left and right direction is shown as the Y axis, and the up and down direction is shown as the Z axis.

The work implement 4 has a drawbar 40, a circle 41, the blade 42, a hydraulic motor 49, various types of hydraulic cylinders 44 to 48, and the like. The various types of hydraulic cylinders 44 to 48 include lift cylinders 44 and 45, a drawbar shift cylinder 46, a blade shift cylinder 47, and a tilt cylinder 48 (refer to FIG. 2). The hydraulic motor 49 and the hydraulic cylinders 44 to 48 are driven by hydraulic oil from a hydraulic pump which is not shown in the diagram.

The front section of the drawbar 40 is attached to the front section of the front section vehicle body 6 so as to be able to swing. Due to the synchronized expansion and contraction of the pair of lift cylinders 44 and 45, the rear section of the drawbar 40 is raised and lowered. In addition, the drawbar 40 swings while centering around an axis along the front and back direction due to the lift cylinders 44 and 45 expanding and contracting differently. Furthermore, the drawbar 40 moves to the left and right due to the expansion and contraction of the drawbar shift cylinder 46.

The circle 41 is attached to the rear section of the drawbar 40 so as to be able to rotate. The circle 41 is driven by the hydraulic motor 49 (refer to FIG. 1). Due to this, the circle 41 rotates in the clockwise direction or counterclockwise direction with regard to the drawbar 40 as seen from above the vehicle.

The blade 42 is supported so as to be able to slide in the left and right direction with regard to the circle 41. In addition, the blade 42 is supported to be able to swing while centering on a shaft which is parallel to the left and right direction with regard to the circle 41. The blade 42 moves left and right with regard to the circle 41 using the blade shift cylinder 47. In addition, the blade 42 swings while centering on a shaft which is parallel to the left and right direction with regard to the circle 41 using the tilt cylinder 48 (refer to FIG. 2). As described above, it is possible for the blade 42 to perform raising and lowering up and down, changing of the inclining with regard to the front and back direction, changing of the inclining with regard to the left and right direction, rotation, and shifting in the left and right direction via the drawbar 40 and the circle 41.

Figure 3:
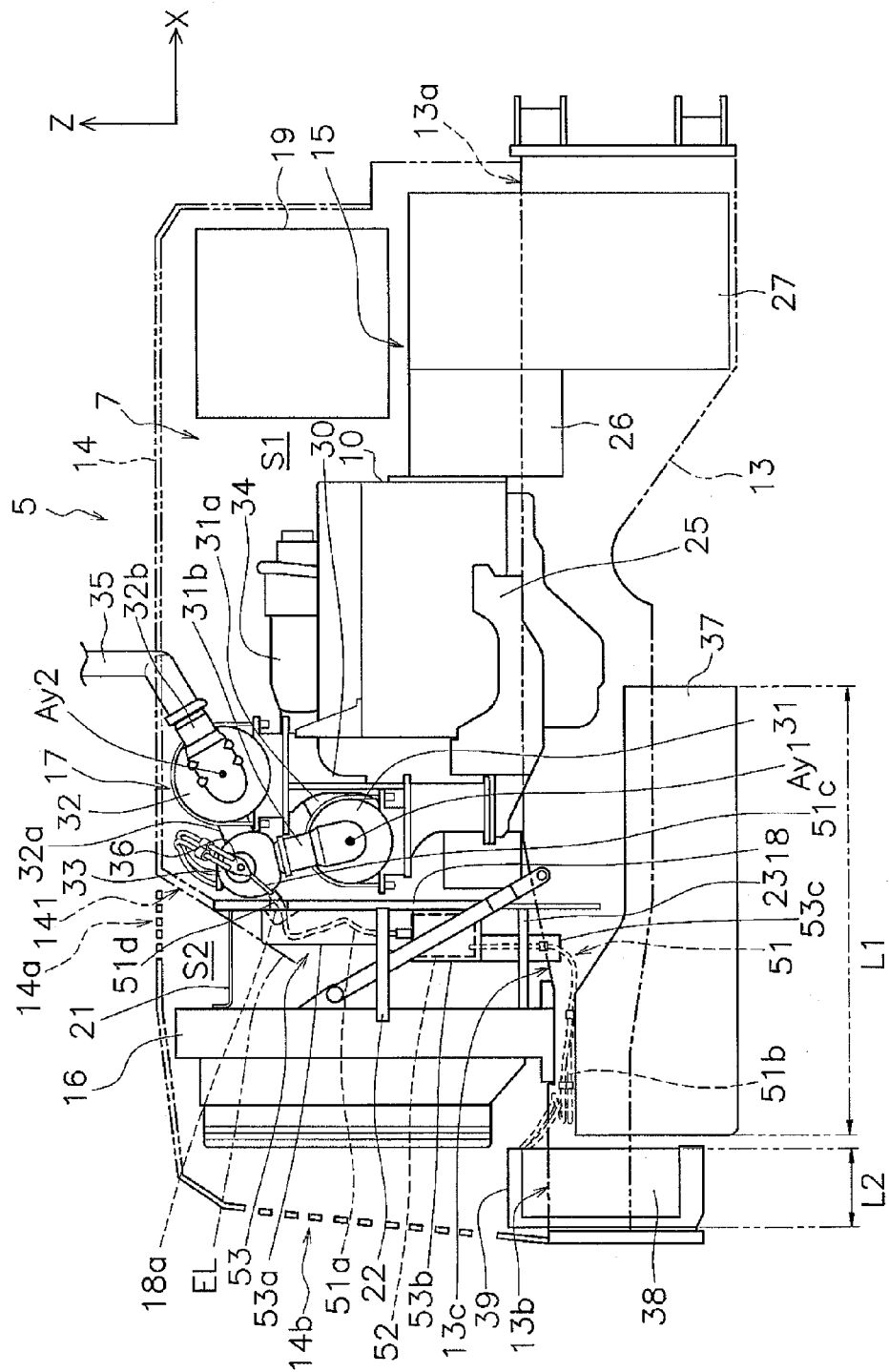
FIG. 3 is a side surface view of the configuration in an engine compartment of the work vehicle.
Figure 4:
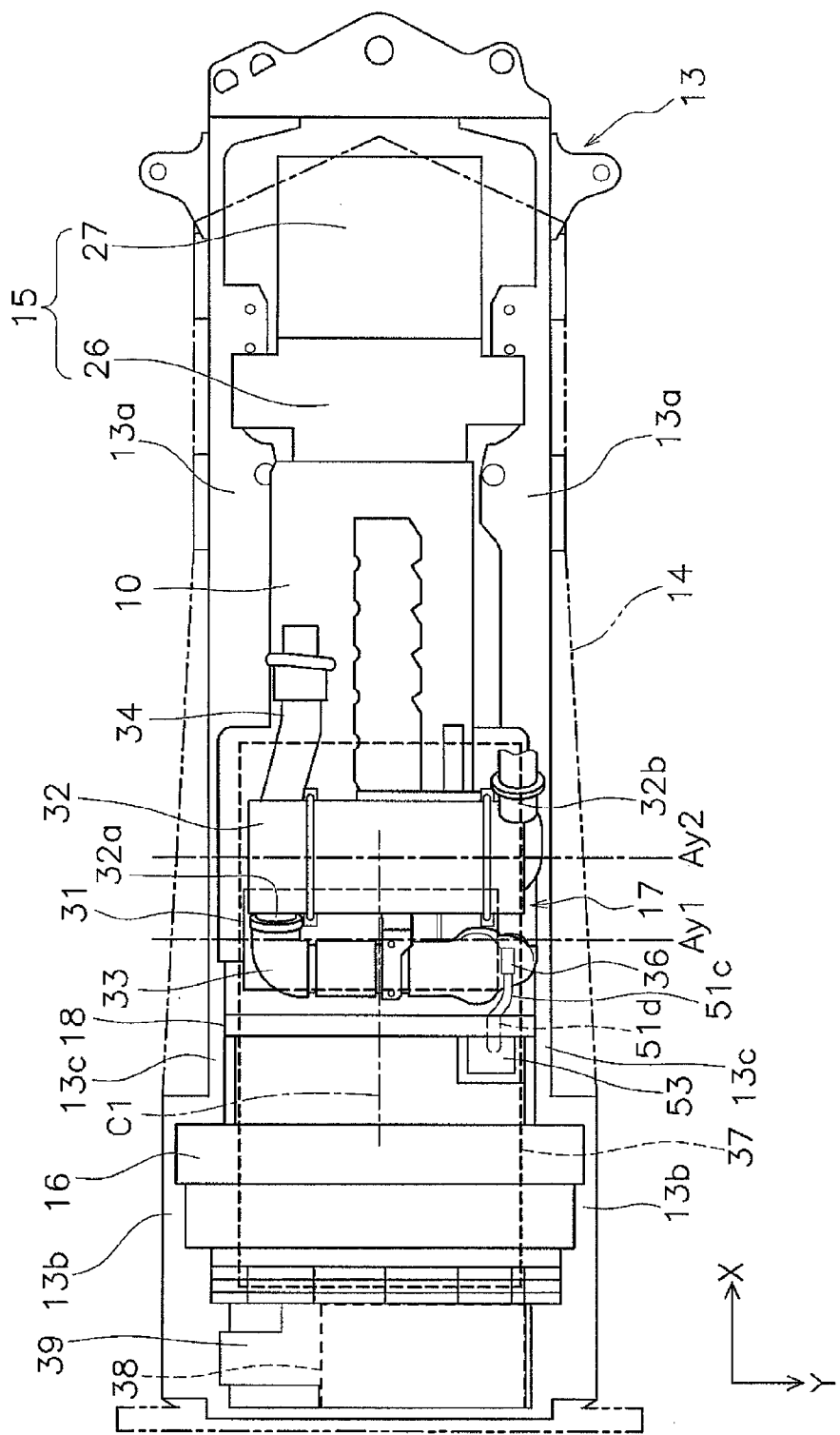
FIG. 4 is a planar view of the configuration in the engine compartment.

FIG. 3 is a right side surface diagram of the internal configuration of the engine compartment 7. FIG. 4 is a planar diagram of the internal configuration of the engine compartment 7. As shown in FIG. 3 and FIG. 4, the rear section vehicle body 5 has a vehicle body frame 13 and a vehicle body cover 14. In FIG. 3, for convenience of description, the outer shapes of the vehicle body frame 13 and the vehicle body cover 14 are shown by a two-dot chain line. In addition, in FIG. 4, for convenience of description, the outer shape of the vehicle body cover 14 is shown by a two-dot chain line.

As shown in FIG. 3, the upper edge section of the vehicle body frame 13 has a first support section 13a, a second support section 13b, and a tapered section 13c. The first support section 13a is positioned forwards the second support section 13b. The tapered section 13c is positioned between the first support section 13a and the second support section 13b. The second support section 13b is positioned below the first support section 13a. The tapered section 13c is inclined obliquely downward and toward the rear. Here, the first support section 13a, the second support section 13b, and the tapered section 13c are provided to be substantially left and right symmetrical at both the left and right sides of the vehicle body frame 13.

The vehicle body cover 14 is attached to the vehicle body frame 13. The vehicle body cover 14 covers the engine compartment 7. In detail, the vehicle body cover 14 covers the top, the left, the right, and the rear of the engine compartment 7.

An engine 10, a power transmission apparatus 15, a radiator 16, an exhaust processing unit 17, a hydraulic oil tank 19, and the like are arranged in the engine compartment 7. The radiator 16, the exhaust processing unit 17, the engine 10, and the power transmission apparatus 15 are arranged in order from the rear of the vehicle toward the front of the vehicle. The hydraulic oil tank 19 is arranged above the power transmission apparatus 15. Here, the hydraulic oil tank 19 shown in FIG. 3 is omitted in FIG. 4 for ease of understanding.

The work vehicle 1 is provided with a partition wall 18. The partition wall 18 is arranged between the engine 10 and the radiator 16 in the front and back direction. As shown in FIG. 3, the partition wall 18 partitions the inside section of the engine compartment 7 into a first accommodation space S1 and a second accommodation space S2. The partition wall 18 has a plate shape which extends in the up and down direction and the left and right direction. The partition wall 18 is supported by the radiator 16 through a plurality of support members 21 to 23. The exhaust processing unit 17, the engine 10, and the power transmission apparatus 15 are accommodated in the first accommodation space S1. The radiator 16 is accommodated in the second accommodation space S2.

The upper surface of the vehicle body cover 14 described above is provided with an upper section opening 14a. The upper section opening 14a is arranged above the second accommodation space S2 and is linked to the second accommodation space S2. The front edge section of the upper section opening 14a is positioned forwards the partition wall 18. The vehicle body cover 14 includes an inclined surface section 141. The inclined surface section 141 is provided to span across the front edge section of the upper section opening 14a and the upper end section of the partition wall 18. The inclined surface section 141 is inclined obliquely forward and upward.

A rear section opening 14b is provided in the rear surface of the vehicle body cover 14. The rear section opening 14b is positioned behind the radiator 16. The air outside the vehicle is taken from the upper section opening 14a into the second accommodation space S2. The air passes through the radiator 16 in the second accommodation space S2 and is discharged to the outside of the vehicle from the rear section opening 14b.

The engine 10 is supported by the vehicle body frame 13 via a mounting bracket 25. The mounting bracket 25 is attached to the first support section 13a.

The power transmission apparatus 15 transmits power from the engine 10. The power transmission apparatus 15 has a transmission 27 and a torque converter 26. The torque converter 26 is connected to the output side of the engine 10. The torque converter 26 transmits power from the engine 10 to the transmission 27. The transmission 27 is connected to the output side of the torque converter 26. The transmission 27 has a clutch, transmission gears, and the like which are not shown in the diagram. The transmission 27 transmits the power from the engine 10 to the rear wheels 12 through a final reduction gear and a tandem apparatus which are not shown in the diagram.

The radiator 16 cools the cooling water of the engine 10. The radiator 16 is arranged behind the engine 10 and the exhaust processing unit 17. In other words, the engine 10 and the exhaust processing unit 17 are arranged forwards the radiator 16. The radiator 16 is supported by the second support section 13b. That is, the radiator 16 is supported by the vehicle body frame 13 at a position which is lower than the supporting position of the engine 10.

The exhaust processing unit 17 has an exhaust processing apparatus support bracket 30, a first exhaust processing apparatus 31, a second exhaust processing apparatus 32, and a second connecting pipe 33. In addition, the work vehicle 1 is further provided with a first connecting pipe 34 and an exhaust pipe 35. The first connecting pipe 34 is a pipe for feeding exhaust of the engine 10 into the exhaust processing unit 17. The exhaust pipe 35 is a pipe for discharging exhaust, which is processed in the exhaust processing unit 17, to the outside.

The exhaust processing apparatus support bracket 30 supports the first exhaust processing apparatus 31 and the second exhaust processing apparatus 32. The exhaust processing apparatus support bracket 30 is attached to the mounting bracket 25.

For example, the first exhaust processing apparatus 31 is a diesel particulate filter apparatus. The first exhaust processing apparatus 31 processes the exhaust from the engine 10 which is fed through the first connecting pipe 34. The first exhaust processing apparatus 31 captures the particulate matter which is included in the exhaust using a filter. The first exhaust processing apparatus 31 incinerates the captured particulate matter using a heater which is installed in the filter.

The first exhaust processing apparatus 31 has a substantially cylindrical outer shape. As shown in FIG. 3 and FIG. 4, the first exhaust processing apparatus 31 is arranged such that a center axis line Ay1 thereof is along the vehicle width direction. The first exhaust processing apparatus 31 has a first connecting port 31a and a second connecting port 31b. The first connecting pipe 34 is connected to the first connecting port 31a. The second connecting pipe 33 is connected to the second connecting port 31b.

The first connecting port 31a protrudes obliquely upward. Specifically, the first connecting port 31a protrudes obliquely upward and toward the engine 10 side. The bottom section of the first exhaust processing apparatus 31 is positioned below the highest position of the engine 10. The first exhaust processing apparatus 31 is arranged at a position which does not overlap with the engine 10 in planar view. In detail, the first exhaust processing apparatus 31 is arranged behind the engine 10. The first exhaust processing apparatus 31 is arranged between the engine 10 and the partition wall 18 in the front and back direction.

The second connecting port 31b is inclined from the up and down direction toward the rear. The second connecting pipe 33 is connected to the first exhaust processing apparatus 31 and the second exhaust processing apparatus 32. As shown in FIG. 3, the outer diameter of the second connecting pipe 33 is smaller than the outer diameter of the first exhaust processing apparatus 31. One end of the second connecting pipe 33 is connected to the second connecting port 31b of the first exhaust processing apparatus 31. The other end of the second connecting pipe 33 is connected to a third connecting port 32a of the second exhaust processing apparatus 32.

The second connecting pipe 33 is arranged above the first exhaust processing apparatus 31. In addition, the second connecting pipe 33 is arranged behind the second exhaust processing apparatus 32. The top section of the second connecting pipe 33 is positioned below the top section of the second exhaust processing apparatus 32. A reducing agent ejection apparatus 36 is attached to the second connecting pipe 33. The reducing agent ejection apparatus 36 ejects the reducing agent inside the second connecting pipe 33.

The second exhaust processing apparatus 32 is a selective catalytic reduction apparatus. The second exhaust processing apparatus 32 processes the exhaust from the engine 10 which is processed by the first exhaust processing apparatus 31. The second exhaust processing apparatus 32 selectively reduces the nitrogen oxide NOx using the reducing agent. For example, aqueous urea or the like is used as the reducing agent.

The second exhaust processing apparatus 32 has a substantially cylindrical outer shape. As shown in FIG. 4, the second exhaust processing apparatus 32 is arranged such that a center axis line Ay2 thereof is along the vehicle width direction. In addition, the second exhaust processing apparatus 32 is arranged such that the center axis line Ay2 is parallel to the center axis line Ay1 of the first exhaust processing apparatus 31. The second exhaust processing apparatus 32 is arranged above the first exhaust processing apparatus 31. In detail, the bottom section of the second exhaust processing apparatus 32 is arranged above the top section of the first exhaust processing apparatus 31. The second exhaust processing apparatus 32 is arranged to overlap a portion of the first exhaust processing apparatus 31 in planar view. In addition, the second exhaust processing apparatus 32 is arranged so as to overlap a portion of the engine 10 in planar view.

The second connecting pipe 33 and the reducing agent ejection apparatus 36 are arranged between the second exhaust processing apparatus 32 and the partition wall 18. The second connecting pipe 33 is arranged below the inclined surface section 141 described above. In other words, the inclined surface section 141 is arranged above the second connecting pipe 33. The second connecting pipe 33 and the reducing agent ejection apparatus 36 are arranged between the engine 10 and a reducing agent tank 38 which will be described later in the front and back direction.

The second exhaust processing apparatus 32 has the third connecting port 32a and a fourth connecting port 32b. The second connecting pipe 33 is connected to the third connecting port 32a. The exhaust pipe 35 is connected to the fourth connecting port 32b. The third connecting port 32a is inclined downward from the horizontal direction toward the rear.

The fourth connecting port 32b protrudes obliquely upward. Specifically, the fourth connecting port 32b protrudes upward and obliquely toward the engine 10 side. Due to this, the exhaust pipe 35 protrudes obliquely upward above the engine 10. The upper section of the exhaust pipe 35 protrudes upward from the vehicle body cover 14.

The engine 10, the first connecting pipe 34, the first exhaust processing apparatus 31, the second connecting pipe 33, the second exhaust processing apparatus 32, and the exhaust pipe 35 are connected in series in this order. Accordingly, the exhaust from the engine 10 passes through the first connecting pipe 34 and is fed into the first exhaust processing apparatus 31. In the first exhaust processing apparatus 31, particulate matter is mostly reduced from in the exhaust. Next, the exhaust passes through the second connecting pipe 33 and is fed into the second exhaust processing apparatus 32. In the second exhaust processing apparatus 32, the NOx is mostly reduced. Thereafter, the cleaned exhaust passes through the exhaust pipe 35 and is discharged to the outside.

A fuel tank 37 for retaining fuel and the reducing agent tank 38 for retaining the reducing agent are arranged below the engine compartment 7. The fuel tank 37 and the reducing agent tank 38 are arranged to protrude below the vehicle body frame 13. The fuel tank 37 is arranged so as to at least partially overlap with the engine 10 in planar view. The fuel tank 37 is arranged between the transmission 27 and the reducing agent tank 38 in the front and back direction. That is, the transmission 27 is arranged in front of the fuel tank 37. The reducing agent tank 38 is arranged behind the fuel tank 37. As shown in FIG. 3, a front and back length L1 of the fuel tank 37 is longer than a front and back length L2 of the reducing agent tank 38.

The reducing agent tank 38 is arranged behind the partition wall 18. The reducing agent tank 38 is arranged behind the radiator 16. The upper end section of the reducing agent tank 38 is positioned above the lower end section of the radiator 16. The upper end section of the reducing agent tank 38 is positioned above the upper end section of the fuel tank 37. The lower end section of the reducing agent tank 38 is positioned above the lower end section of the fuel tank 37. A top plate 39 is arranged above the reducing agent tank 38. Due to this, hot air from the radiator 16 does not directly hit the reducing agent tank 38 and the reducing agent is not easily heated.

As shown in FIG. 3, the reducing agent tank 38 and the second exhaust processing apparatus 32 are connected using a reducing agent hose 51. The reducing agent hose 51 is arranged so as to pass from the reducing agent tank 38, below the radiator 16, and extend to the front. The reducing agent hose 51 bends upward between the radiator 16 and the partition wall 18 and is arranged so as to extend in the up and down direction along the partition wall 18. The partition wall 18 has a through hole 18a, and the upper section of the reducing agent hose 51 passes through the through hole 18a and is connected to the reducing agent ejection apparatus 36 in the first accommodation space S1.

In detail, the reducing agent hose 51 has a first hose portion 51a, a second hose portion 51b, a third hose portion 51c, and a boundary portion 51d. The first hose portion 51a is arranged along the partition wall 18 in the second accommodation space S2. The first hose portion 51a is arranged so as to extend in the up and down direction along the partition wall 18 in the second accommodation space S2. A reducing agent pump 52 is connected in the middle of the first hose portion 51a. The reducing agent pump 52 is attached to the partition wall 18 in second accommodation space S2.

The second hose portion 51b is arranged so as to pass below the radiator 16. The second hose portion 51b is arranged so as to pass above the fuel tank 37. That is, the second hose portion 51b is arranged so as to pass between the radiator 16 and the fuel tank 37.

The third hose portion 51c is arranged in the first accommodation space S1. The third hose portion 51c is connected to the reducing agent ejection apparatus 36. The boundary portion 51d is positioned at the boundary between the first accommodation space S1 and the second accommodation space S2. That is, the boundary portion 51d is a portion which passes through the through hole 18a in the reducing agent hose 51. Accordingly, the boundary portion 51d is positioned between the first hose portion 51a and the third hose portion 51c.

Figure 5:
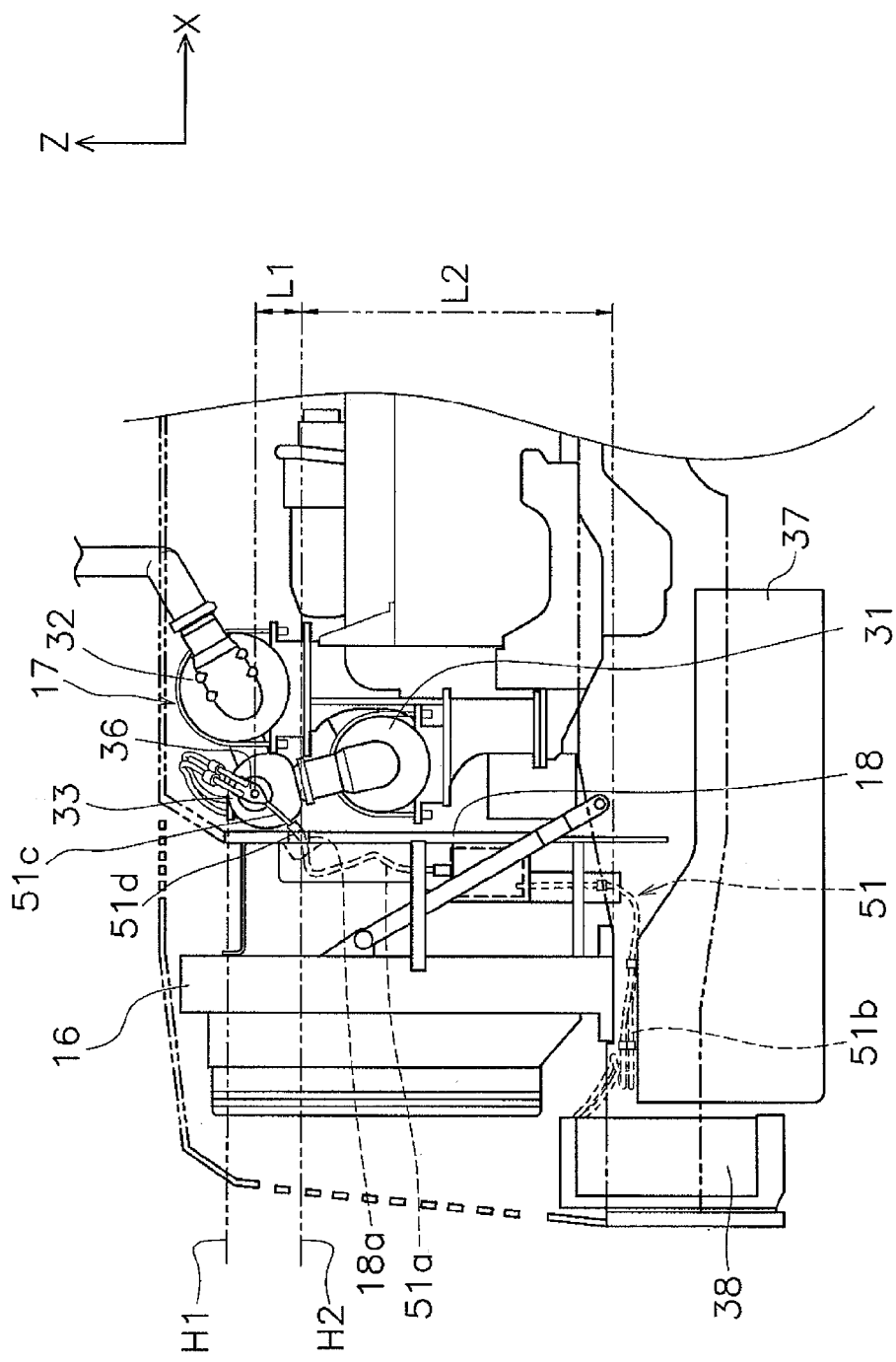
FIG. 5 is a side surface view illustrating a portion of the configuration in the engine compartment.

Here, the through hole 18a of the partition wall 18 described above is positioned above the center position in the up and down direction of the partition wall 18. In addition, the distance in the up and down direction between the through hole 18a and the reducing agent ejection apparatus 36 is smaller than the distance in the up and down direction between the through hole 18a and the lower end portion of the radiator 16. Accordingly, the boundary portion 51d is positioned above the center position in the up and down direction of the partition wall 18. In addition, as shown in FIG. 5, the distance L1 in the up and down direction between the boundary portion 51d and the reducing agent ejection apparatus 36 is smaller than the distance L2 in the up and down direction between the boundary portion 51d and the lower end portion of the radiator 16. In addition, the position of the height of the boundary portion 51d is positioned between a position of the height of the top section of the second connecting pipe 33 (refer to a two-dot chain line H1) and the position of the height of the bottom section (refer to a two-dot chain line H2) in the up and down direction.

Furthermore, as shown in FIG. 4, the boundary portion 51d and the reducing agent ejection apparatus 36 are arranged on the same side with regard to a center line C1 which extends in the front and back direction of the partition wall 18. Specifically, the boundary portion 51d and the reducing agent ejection apparatus 36 are arranged together on the right side with regard to the center line C1 which extends in the front and back direction of the partition wall 18. Here, the boundary portion 51d and the reducing agent ejection apparatus 36 may be arranged together on the left side with regard to the center line C1 which extends in the front and back direction of the partition wall 18.

By the boundary portion 51d being arranged at a position as described above, the third hose portion 51c is significantly shorter than the first hose portion 51a. As a result, the portion which is exposed to a high temperature environment in the first accommodation space S1 in the reducing agent hose 51 is extremely short.

Figure 6:
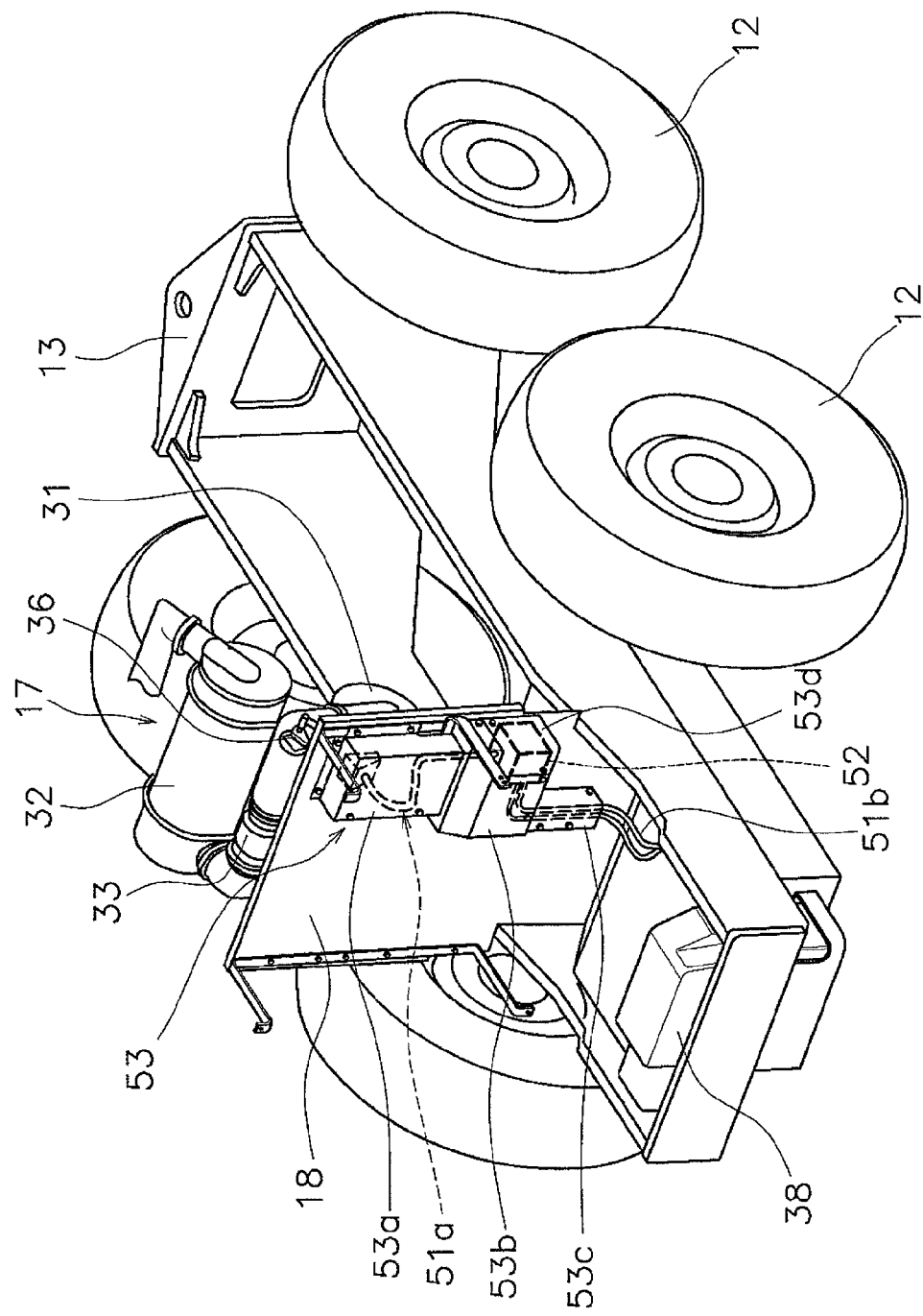
FIG. 6 is a perspective view of the configuration in the engine compartment.

FIG. 6 is a perspective view illustrating a portion of the configuration of the engine compartment 7. As shown in FIG. 3 and FIG. 6, the work vehicle 1 has a cover member 53. The cover member 53 covers at least a portion of the reducing agent hose 51 in the second accommodation space S2. In detail, the cover member 53 covers the first hose portion 51a and the reducing agent pump 52. In addition, the cover member 53 covers the through hole 18a of the partition wall 18 described above. The cover member 53 is attached to the partition wall 18. As shown in FIG. 3, the cover member 53 is positioned on the lower side of a virtual extended line EL of the inclined surface section 141 in a side view.

In detail, the cover member 53 has a first cover section 53a, a second cover section 53b, and a third cover section 53c. The first cover section 53a covers the through hole 18a of the partition wall 18 and the upper section of the first hose portion 51a. The upper section of the first hose portion 51a is a portion which is positioned above the reducing agent pump 52 in the first hose portion 51a. The second cover section 53b is arranged below the first cover section 53a. The second cover section 53b covers the reducing agent pump 52. The second cover section 53b has a lid 53d. The lid 53d is attached with regard to the other portions of the second cover section 53b so as to be able to be attached and detached. Due to this, the access to the reducing agent pump 52 is easy and the maintenance of the reducing agent pump 52 is easy.

The third cover section 53c is arranged below the second cover section 53b. The third cover section 53c covers the lower section of the first hose portion 51a. The lower section of the first hose portion 51a is a portion which is positioned below the reducing agent pump 52 in the first hose portion 51a. The third cover section 53c extends up to a position below the upper edge section of the vehicle body frame 13. In detail, the lower end portion of the third cover section 53c is positioned below the tapered section 13c of the vehicle body frame 13. The lower end portion of the third cover section 53c is positioned below the lower end portion of the radiator 16.

The work vehicle 1 according to the present embodiment has the following characteristics.

The reducing agent tank 38 is arranged behind the partition wall 18. Accordingly, the reducing agent tank 38 is arranged to be separated from the engine 10 and the second exhaust processing apparatus 32. Due to this, it is possible to suppress an excessive increase in the temperature of the reducing agent in the reducing agent tank 38.

In addition, the boundary portion 51d of the reducing agent hose 51 is positioned between the top section and the bottom section of the second connecting pipe 33 in the up and down direction. Furthermore, the boundary portion 51d and the reducing agent ejection apparatus 36 are arranged on the same side with regard to the center line C1 which extends in the front and back direction of the partition wall 18. Accordingly, it is possible to shorten the portion from the boundary portion 51*d* up to the reducing agent ejection apparatus 36 in the reducing agent hose 51, that is, the length of the third hose portion 51*c* which is arranged in the first accommodation space S1 along with the engine 10. Due to this, it is possible to suppress an excessive increase in the temperature of the reducing agent in the reducing agent hose 51.

The reducing agent hose 51 is arranged so as to pass through the through hole 18*a* of the partition wall 18. As a result, it is possible to shorten the length of the reducing agent hose 51 compared to a case where the reducing agent hose 51 bypasses to the side or the like of the partition wall 18. In addition, since the through hole 18*a* is covered by the cover member 53, it is possible to suppress the influence of the heat from the first accommodation space S1 to the second accommodation space S2.

The first hose portion 51*a* is arranged so as to extend in the up and down direction along the partition wall 18 in the second accommodation space S2. As a result, it is possible to shorten the length of the first hose portion 51*a*.

The reducing agent pump 52 is attached to the partition wall 18 in the second accommodation space S2. As a result, it is possible to suppress an excessive increase in the temperature of the reducing agent in the reducing agent pump 52.

Since the second accommodation space S2 is a space where the radiator 16 is accommodated, cooling air from the radiator 16 flows into the second accommodation space S2. In the work vehicle 1 according to the present embodiment, the cover member 53 covers the first hose portion 51*a* in the second accommodation space S2. As a result, it is possible to suppress an excessive decrease in the temperature of the reducing agent in the first hose portion 51*a* due to the cooling air.

The cover member 53 covers the reducing agent pump 52. As a result, it is possible to suppress an excessive decrease in the temperature of the reducing agent in the reducing agent pump 52.

The cover member 53 is attached to the partition wall 18. As a result, the attachment of the cover member 53 is easy.

The second hose portion 51*b* is arranged so as to pass below the radiator 16. As a result, the reducing agent in the second hose portion 51*b* is not easily influenced by the cooling air of the radiator 16.

It is possible to increase the area of the upper section opening 14*a* due to the inclined surface section 141. Due to this, it is possible to increase the volume of the air which passes through the upper section opening 14*a*. In addition, the inclined surface section 141 is arranged above the second connecting pipe 33. As a result, it is possible to arrange the second connecting pipe 33 in a compact manner using the space below the inclined surface section 141.

The cover member 53 is positioned on the lower side of the virtual extended line EL of the inclined surface section 141. As a result, it is possible to protect the reducing agent hose 51 in the cover member 53 from the air flow which flows along the inclined surface section 141.

Above, an embodiment of the present invention has been described but the present invention is not limited to the embodiment described above and various modifications are possible in a scope which does not depart from the gist of the invention.

The work vehicle 1 is not limited to the motor grader. The work vehicle 1 may be another type of work vehicle such as a wheel loader, a hydraulic excavator, or a bulldozer.

The configuration of the exhaust processing unit 17 is not limited to the configuration described above. For example, the first exhaust processing apparatus 31 may be an apparatus which is different to the diesel particulate filter apparatus. Alternatively, the first exhaust processing apparatus 31 may be omitted. The second exhaust processing apparatus 32 may use a reducing agent other than aqueous urea.

The positions of the first exhaust processing apparatus 31 and the second exhaust processing apparatus 32 are not limited to the positions described above. For example, the first exhaust processing apparatus 31 may be arranged above the second exhaust processing apparatus 32. Alternatively, the second exhaust processing apparatus 32 may be arranged behind the first exhaust processing apparatus 31.

In the embodiment described above, the second hose portion 51*b* is not covered by the cover member 53. However, the second hose portion 51*b* may be covered by the cover member 53. That is, the whole of the reducing agent hose 51 may be covered by the cover member 53. Alternatively, the cover member 53 may be omitted.

The reducing agent pump 52 may be arranged at a position which is different from the position in the embodiment described above. For example, the reducing agent pump 52 may be connected to the second hose portion 51*b*. The cover member 53 may be attached to a member other than the partition wall 18.

The reducing agent tank 38 is not limited to being behind the radiator 16 and may be positioned in other positions. For example, the reducing agent tank 38 may be positioned below the radiator 16.

The second connecting pipe 33 and the reducing agent ejection apparatus 36 are not limited to being between the second exhaust processing apparatus 32 and the partition wall 18 and may be arranged at other positions. However, in order to shorten the portion which is arranged in the first accommodation space S1 in the reducing agent hose 51, it is preferable that the second connecting pipe 33 and the reducing agent ejection apparatus 36 be arranged between the second exhaust processing apparatus 32 and the partition wall 18.

The inclined surface section 141 may be omitted. However, from the point of view of increasing the area of the upper section opening 14*a* of the vehicle body cover 14, it is preferable to provide the inclined surface section 141.

According to the present invention, it is possible to provide a work vehicle where it is possible to suppress an excessive increase in the temperature of a reducing agent.

The invention claimed is:

1. A work vehicle comprising:
   an engine;
   a selective catalytic reduction apparatus configured to process exhaust from the engine;
   a connecting pipe connected to the selective catalytic reduction apparatus;
   a radiator arranged behind the engine, the selective catalytic reduction apparatus, and the connecting pipe;
   a partition wall partitioning
   a first accommodation space where the engine, the selective catalytic reduction apparatus, and the connecting pipe are arranged and
   a second accommodation space where the radiator is arranged;
   a reducing agent tank configured to retain a reducing agent, the reducing agent tank being arranged behind the partition wall;
   a reducing agent ejection apparatus attached to the connecting pipe, the reducing agent ejection apparatus being configured to eject the reducing agent into the connecting pipe; and a reducing agent hose connecting the reducing agent tank and the reducing agent ejection apparatus, the reducing agent hose having a boundary portion positioned between the first accommodation space and the second accommodation space, a height position of the boundary portion being between a top section and a bottom section of the connecting pipe along an up and down direction, and the boundary portion and the reducing agent ejection apparatus both being arranged on one of a left side and a right side with respect to a center line extending in a front and back direction of the partition wall.

2. The work vehicle according to claim 1, wherein
the partition wall has a through hole,
the reducing agent hose is arranged to pass through the through hole, and
the boundary portion passes through a through hole in the reducing agent hose.

3. The work vehicle according to claim 1, wherein
the reducing agent hose includes a first hose portion is arranged to extend in the up and down direction along the partition wall in the second accommodation space.

4. The work vehicle according to claim 3, further comprising:
a reducing agent pump connected to the reducing agent hose, the reducing agent pump being attached to the partition wall in the second accommodation space.

5. The work vehicle according to claim 3, further comprising:
a cover member arranged to cover the first hose portion.

6. The work vehicle according to claim 4, further comprising:
a cover member arranged to cover the reducing agent pump.

7. The work vehicle according to claim 5, wherein
the cover member is attached to the partition wall.

8. The work vehicle according to claim 3, wherein
the reducing agent hose further includes a second hose portion arranged to pass below the radiator.

9. The work vehicle according to claim 5, further comprising:
a vehicle body cover including an opening arranged above the second accommodation space, the opening communicating with the second accommodation space, a front end portion of the opening being positioned forward of the partition wall, the vehicle body cover including an inclined surface section spanning across the front end portion of the opening and an upper end portion of the partition wall, the inclined surface section being inclined obliquely forward and upward, and the inclined surface section being arranged above the connecting pipe.

10. The work vehicle according to claim 9, wherein
the cover member is positioned at a lower side of a virtual extended line of the inclined surface section.

* * * * *